United States Patent [19]

Klas

[11] 4,231,215
[45] Nov. 4, 1980

[54] SINGLE BELT DRIVE FOR A THREE-SPINDLE ROTARY MOWER

[75] Inventor: Kenneth H. Klas, Port Washington, Wis.

[73] Assignee: Allis-Chalmers Corporation, Milwaukee, Wis.

[21] Appl. No.: 31,400

[22] Filed: Apr. 19, 1979

[51] Int. Cl.³ .................................................. A01D 35/26
[52] U.S. Cl. .................................... 56/11.6; 56/15.3; 56/DIG. 22
[58] Field of Search .................. 56/11.3, 11.6, 15.3, 56/15.6, 6, DIG. 22

[56] References Cited
U.S. PATENT DOCUMENTS

| | | | |
|---|---|---|---|
| 3,339,353 | 9/1967 | Schreyer | 56/6 |
| 4,068,452 | 1/1978 | Schaefer et al. | 56/11.6 |
| 4,102,114 | 7/1978 | Estes et al. | 56/DIG. 22 |

*Primary Examiner*—Jay N. Eskovitz
*Attorney, Agent, or Firm*—Charles L. Schwab

[57] ABSTRACT

A single V-belt power transmission is provided for a three-spindle rotary mower without the belt crossing over itself or being subject to severe twists. The three spindles of the mower are disposed on vertical axes to form a triangular pattern with the lead or apex angle being forwardly of the other two spindles which are spaced laterally of one another. A swingable clutch idler and a fixed axis idler engage the flat backside of the V-belt and are so positioned on the mower housing that the single V-belt has a large arc of contact with the pulley on the central lead spindle and with a drive pulley positioned forwardly of the lead spindle. The idler pulleys also serve to so position the belt that there will be no contact between runs of the belt. The invention is illustrated in an underslung mower attachment for a riding tractor and includes an automatic brake, a manually operated height adjusting mechanism and a manual control for raising the mower to a transport position.

10 Claims, 7 Drawing Figures

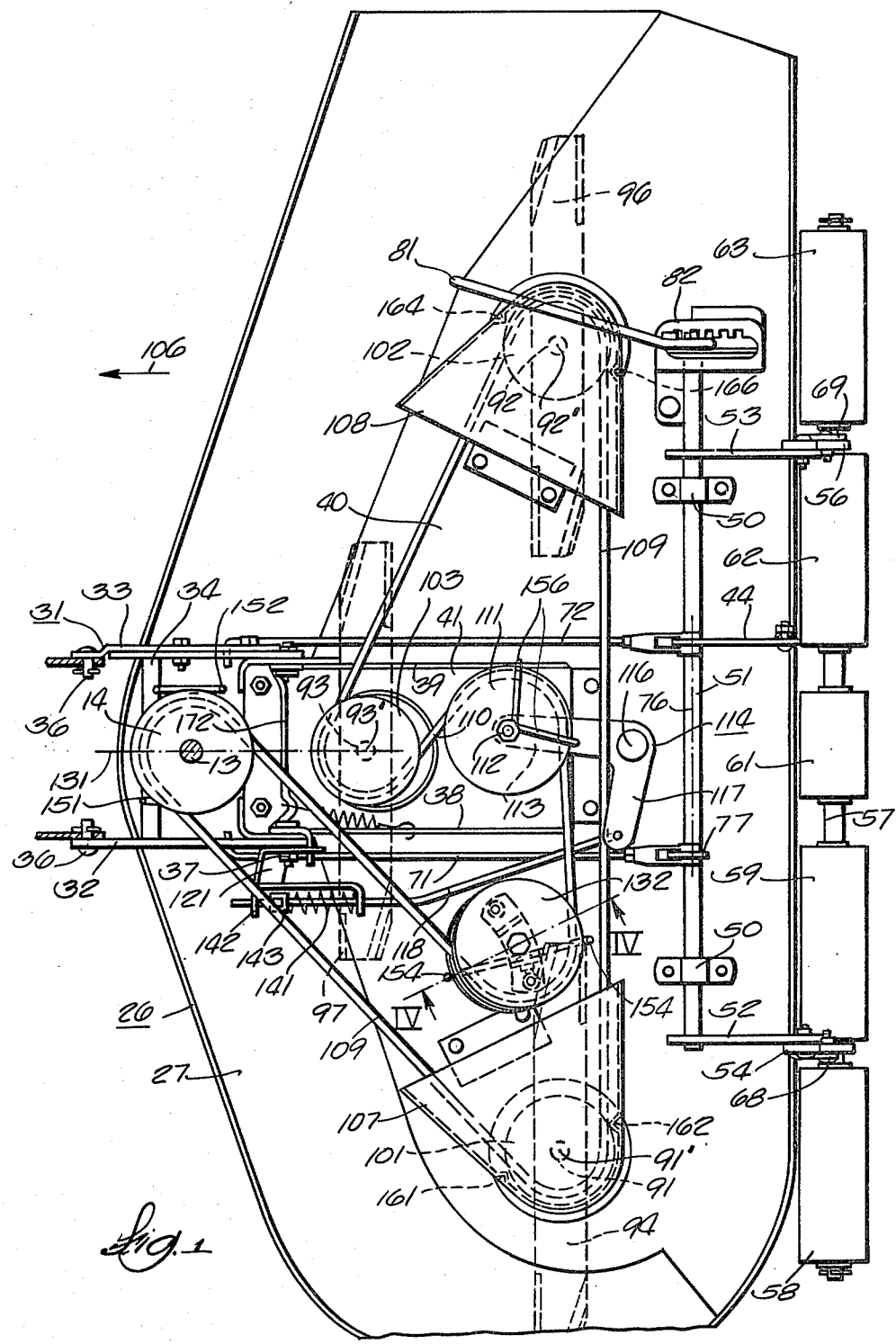

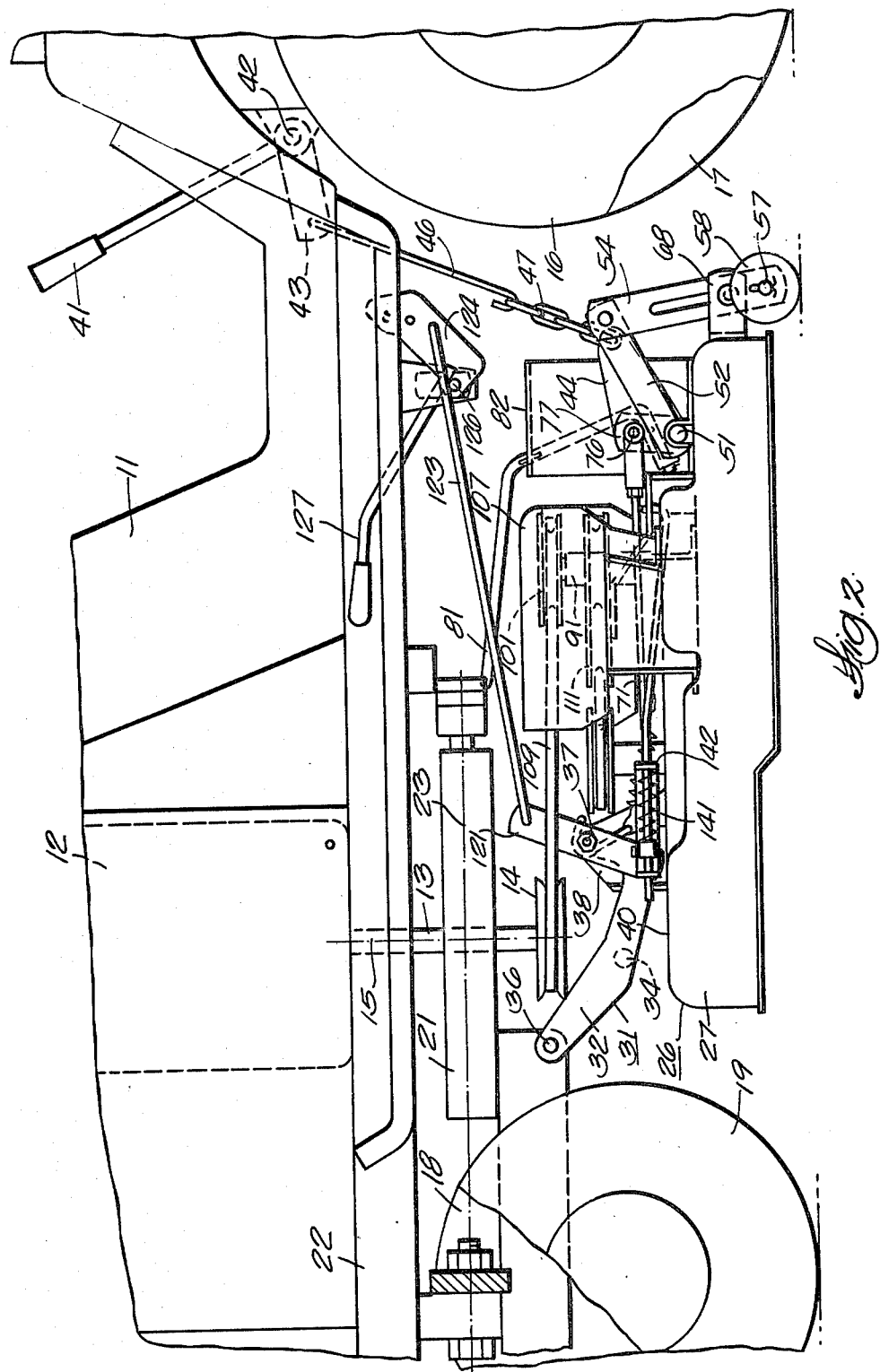

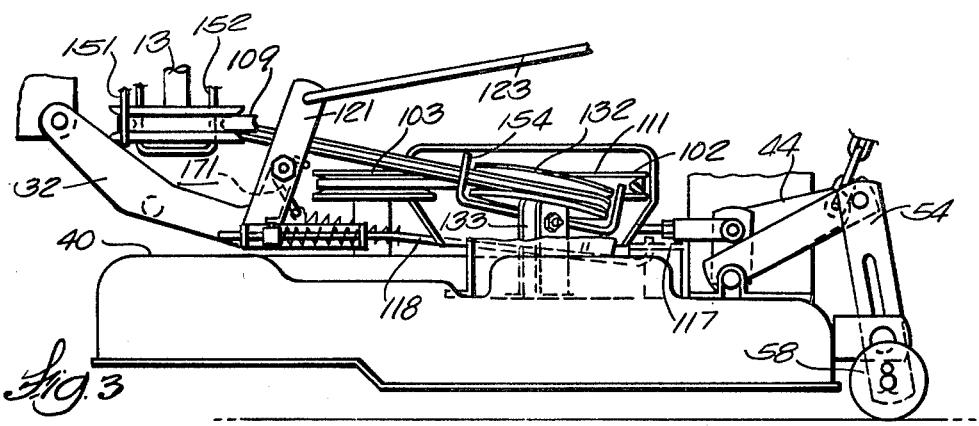
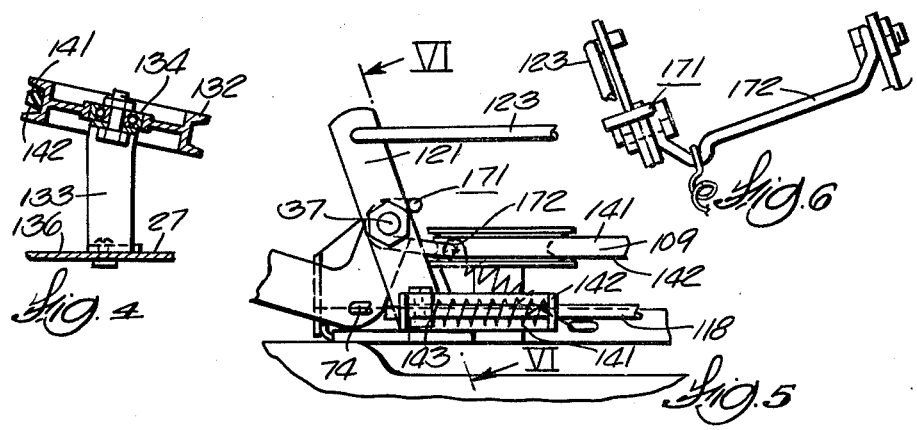
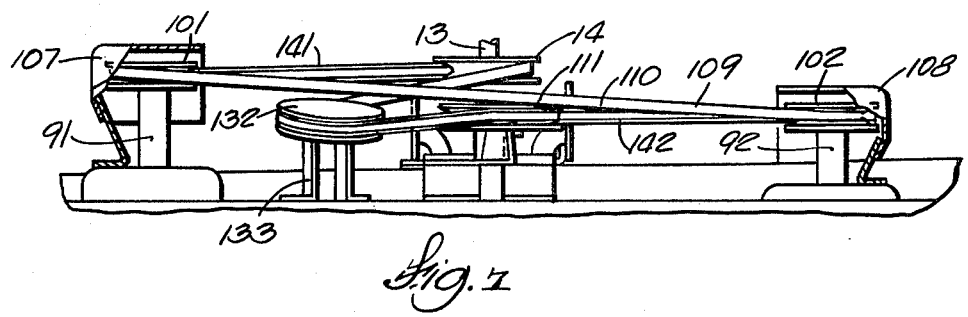

4,231,215

SINGLE BELT DRIVE FOR A THREE-SPINDLE ROTARY MOWER

This invention pertains to a power transmission in the form of a single belt drive for a three-spindle rotary mower for cutting vegetation.

BACKGROUND OF PRIOR ART

Heretofore others have proposed the use of a single belt drive for two-spindle mowers, two such constructions being shown in U.S. Pat. Nos. 3,461,654 and 4,068,452. A single belt drive for a three-spindle mower is shown in U.S. Pat. No. 2,872,831 wherein the laterally outwardly spaced spindles utilize a single sheave and the central spindle has a sheave with three grooves. In the construction shown in U.S. Pat. No. 2,872,831, it is necessary to place a severe twist in the single belt, which is viewed as having a detrimental effect upon the life of the belt and tends to cause the belt to roll over during operation. In U.S. Pat. No. 3,709,062, a single belt drive for a three-spindle mower is shown wherein a separating means is utilized to prevent the belt from rubbing against itself. The belt, instead, rubs against the separating device thereby generating heat and wear which are viewed as having a detrimental effect upon the useful life of the belt.

BRIEF SUMMARY OF THE INVENTION

This invention has particular utility in a power transmission for a mower having a drive pulley and a downwardly open housing with a generally horizontal deck supporting three vertical spindles in a triangular pattern with driven V-belt pulleys secured to upper ends disposed above the deck and cutting blades secured to lower ends disposed below the deck. The power transmission includes a drive pulley and a clutch idler lever pivotally mounted on the housing for rotation about a generally upright axis between a drive establishing position in which the belt is tightened and a nondriving position in which the belt is relaxed. The lever has a radially extending arm which rotatably supports a clutch idler pulley for rotation about an axis spaced from the generally upright axis of the idler lever and from the axes of rotation of the spindles. A single continuous V-belt is trained around the pulleys without severe twists and without crossovers and has but a single arc of contact with each pulley. The tapered driving surfaces of the V-belt are in contact with the grooves of the drive and driven pulleys and a flat backside in contact with said clutch idler pulley.

One of the spindles may be disposed longitudinally of the other two spindles relative to the path of travel of the mower during a mowing operation and the other two spindles disposed laterally from one another a greater distance than either is spaced from the one spindle with the belt sequentially engaging the idler and the pulley on the one spindle.

A second idler pulley may be used to increase the arc of contact of the belt with the drive pulley. As illustrated, the second idler pulley is on a fixed axis which is tilted slightly from a vertical position to cause the second idler pulley to slope upwardly from rear to front at an angle somewhat less than 15 degrees.

The invention achieves an excellent arc of contact, in excess of 120 degrees, with the drive and driven pulleys.

BRIEF DESCRIPTION OF THE DRAWINGS

FIG. 1 is a top view of the mower attachment in which the present invention is incorporated;

FIG. 2 is a side view of a tractor with the mower attachment of FIG. 2 in underslung relation thereto;

FIG. 3 is a side view of the mower attachment with parts broken away for illustration purposes;

FIG. 4 is a view taken along the line IV—IV in FIG. 1;

FIG. 5 is an enlarged view of the idler clutch operating mechanism;

FIG. 6 is a view taken along the lines VI—VI in FIG. 5; and

FIG. 7 is a partial rear view of the mower attachment with parts broken away for illustration purposes.

DETAILED DESCRIPTION OF THE INVENTION

Referring to FIG. 2, a riding tractor 11 includes a vertical crankshaft engine 12 having an output shaft 13 to which is secured a V-belt drive pulley 14 for rotation on the vertical axis 15. The tractor 11 has a pair of rear drive wheels 16, 17 and a pair of front steerable wheels 18, 19, the front wheels being mounted on an axle structure 21 which is pivotally connected to the tractor main frame 22 about a longitudinal axis 23.

Referring also to FIG. 1, a mower in the form of a mower attachment 26 includes a housing 27 which is elongated in a direction transverse to the normal direction of travel of the tractor and the mower attachment, that is, the housing 27 is elongated laterally relative to the direction of travel of the tractor during a mowing operation. The mower housing 27 is connected in draft relation to the tractor by a linkage structure 31 comprised of a pair of legs 32, 33 which are rigidly interconnected by a transverse brace 34 secured as by welding thereto. The front ends of the legs 32, 33 are pivotally connected to laterally spaced portions of the transverse axle 21 by aligned pins 36. The rear ends of the legs 32, 33 are pivotally connected on a transverse axis 37 to longitudinally extending and laterally spaced upstanding flanges 38, 39 of a bracket 41 secured to the top or deck 40 of the housing 27. The mower may be raised to a transport position by a manually operated lift lever 41 pivotally connected to the tractor main frame on a transverse axis 42 and having a forwardly extending crank member 43 which is connected with a lever 44 by a link 46 and chain 47. The lever 44 is secured as by welding to a transverse shaft 51 which is rotatably supported on the deck 40 by a pair of brackets 50. A pair of rearwardly extending roller operating levers 52, 53 have their forward ends welded to the rod 51 and their rearward ends pivotally connected to upright links 54, 56. The axle 57 for the rollers 58, 59, 61, 62, 63 is secured to the lower ends of the links 54, 56. Up and down movement of the links 54, 56 is guided by transverse pins carried by brackets 68, 69 welded to the housing 27.

Referring to FIGS. 1, 2, 3, 5 and 6, the draft linkage 31 is connected to the transverse shaft 51 through a pair of parallel longitudinally extending links 71, 72 which have their forward ends pivotally connected to the legs 32, 33, respectively, on a transverse axis 74, as best shown in FIG. 5, and their rearward ends pivotally connected on a transverse axis 76 to an upright lug 77 welded to the lever 44 and the shaft 51, respectively. The height of cut is set by moving a manually operated lever 81 to a different position in the notched bracket 82. The lever 81 has its lower end connected to the shaft 51 so as to effect rotation of the latter. When the lever 81 is moved in a clockwise direction, as viewed in FIG. 2, the mower housing 27 will be moved upwardly at both its forward and rearward ends.

Three vertical spindles 91, 92, 93 are rotatably supported on the deck 40 of the mower housing 27 in a triangular pattern for rotation on vertical axes 91', 92', 93'. The lower ends of the spindles 91, 92, 93 have secured thereto suitable cutting blades 94, 96, 97. Their upper ends have V-grooved driven pulleys 101, 102, 103 secured for rotation therewith. Spindles 91, 92 are spaced laterally relative to one another, relative to the direction of travel of the mower during the cutting operation, as indicated by the arrow 106, a greater distance than either is spaced from forward or apex spindle 93. The spindle 93 is disposed intermediate the spindles 91, 92 and forwardly of a line or plane through the axes 91', 92' of the spindles 91, 92. Suitable shields 107, 108 are provided for the driven pulleys 101, 102. The three spindles 91, 92, 93 are driven by a single V-belt 109 whose tapered surfaces 141, 142 sequentially engage the pulleys 91, 92, 93.

A clutch idler pulley 111 is pivotally mounted on a vertical axis 112 on the free end of an arm 113 of a belt crank shaped clutch idler lever 114 which is in turn pivotally mounted on a vertical axis 116 to the deck 40 of the housing 27. The idler pulley 111 engages the flat backside 110 of the belt 109. The other arm 117 of the idler lever 114 has its free end pivotally connected to a spring cushioned line 118, the forward end of which is pivotally connected on a transverse pivot axis to the lower end of a lever 121 which is pivoted intermediate its ends on the transverse pivot axis 37 to the vertical flange 38 of the bracket 41. The upper end of the lever 121 is pivotally connected to a longitudinally extending control rod 123, the rear end of which is pivotally connected to a bracket 124 secured to a transverse shaft 126 to which a manual control lever 127 is welded. The transverse shaft 126 is pivotally mounted in suitable brackets secured to the main frame 22.

In order to wrap the belt 109 a sufficient distance around the driven pulley 103 to insure good driving contact of the tapered surfaces 141, 142 of the belt 109 with the pulley, applicant places the clutch idler pulley 111 to the rear and slightly to the right of the longitudinal vertical plane 131 of the mower 26 which passes through the axis 93' of the lead spindle 93. It will also be noted that the pivot axis 116 for the bell crank 114 to which the clutch idler pulley 111 is pivotally journaled is positioned to the rear of pulley 111 and near the longitudinal vertical plane 131 of the mower attachment. As shown in FIG. 4, a fixed position idler pulley 132 is pivotally mounted on an upstanding bracket 133 by a suitable bearing 134. Bracket 133 is securely fastened to the deck 40 of the housing 27. The idler pulley 132 carries the belt sufficiently far to the left of driven spindle pulley 103 to permit the belt to extend therefrom to the drive pulley 14 without contacting the drive pulley 103. The idler pulley 132 also causes the belt 109 to be wrapped around the drive pulley 14 approximately 180 degrees thereby insuring good driving contact with the drive pulley. It will be noted from FIGS. 3, 4 and 7 that the idler pulley 132 is positioned on a slant relative to a horizontal plane so as to correspond approximately with the slope of the belt between the idler pulley 132 and the drive pulley 14. The idler pulley 132 slopes from rear to front at an angle less than 15 degrees and prevents an abrupt change in direction as the belt enters and leaves the pulley 132.

As shown in FIGS. 3 and 7, the belt segments are inclined downwardly from the pulley 101 to pulley 102 and also between the pulley 14 and the idler pulley 132. This inclination between pulleys 101 and 102 is over a relatively long distance and does not adversely affect operation of the drive transmission.

As shown in FIGS. 1, 2, 3, 5 and 6, a bent rod 171 serves as an automatic braking mechanism for the mower drive. When the clutch is disengaged by forward movement of clutch control rod 123, the horizontal portion 172 bears against the flat backside of belt 109, as shown in FIG. 5, thereby stopping the belt.

In the illustrated condition of the single belt power transmission, the clutch idler 111 is in a drive establishing position with the engagement of the clutch idler pulley 111 being cushioned by the spring 141 between the U-shaped bracket 142 which is pivotally connected to the lever 121 and an adjustable stop 143 which is secured by a suitable setscrew to the rod 118. When the clutch operating lever 127 is pivoted clockwise, as viewed from the left side of the tractor, the lower end of lever 121 will be shifted rearwardly and the clutch idler lever 114 will be rotated to a nondriving position to relax the tension of the belt and stop power transmission. In the nondriving position, the loose belt 109 fits loosely on the drive pulley 14 and the brake mechanism 171 is engaged. In order to prevent the belt 109 from moving off the pulleys when the belt is in a declutched, nondriving condition, suitable belt retaining means are provided for the pulleys from which the belt will have the greatest tendency to move out of engagement. Bent wire belt retainers 151, 152 are provided to prevent the belt from coming off the drive pulley 14. A bent wire belt retainer 154 is provided to prevent the belt from coming off idler pulley 132 and a bent wire belt retainer 156 is provided for preventing belt 109 from coming off clutch idler pulley 111. In order to prevent belt 109 from coming off spindle pulleys 101 and 102, the shield 107 is provided with dimples 161, 162 and the shield 108 is provided with dimples 164, 166.

It will be noted that a single belt power transmission has been provided by the present invention for a three-spindle mower wherein the belt does not cross over itself and is not subject to a severe twist. Although the flat backside of the belt is engaged by the idler pulleys 111 and 132 which subject the belt 109 to reverse bending, by selecting their pulleys 111, 132 of predetermined sizes and a suitable, commercially available belt, the belt has been found to provide a satisfactory service life. The illustrated idler pulleys 111, 132 have effective diameters at least equal to the smallest effective diameter of the drive and driven pulleys 14, 101, 102, 103.

The embodiments of the invention in which an exclusive property or privilege is claimed are defined as follows:

1. In a power transmission for a mower movable in a predetermined forward direction of mowing operation having a downwardly open housing with a generally horizontal deck, the combination comprising:
three vertical spindles rotatably supported on said deck in a triangular pattern with upper ends disposed above said deck and lower ends disposed below said deck, one of said spindles being disposed forward of the other two spindles and said other two spindles being disposed on laterally opposite sides of said one spindle, a cutting blade secured to said lower end of each of said spindles for rotation therewith, a driven pulley secured to said upper end of each of said spindles for rotation therewith, a drive pulley disposed on a vertical axis spaced forwardly of said triangular pattern and said one spindle, grooves in each of said driven and drive pulleys adapted to receive a V-belt, a clutch idler lever pivotally mounted on said housing for rotation about a generally upright axis between a drive establishing position in which said belt is tightened and a nondriving position in which said belt is relaxed, said lever having a radially extending arm, a clutch idler pulley rotatably supported on said arm for movement about an axis spaced from said upright axis and from the axes of rotation of said spindles said clutch idler pulley being disposed rearwardly of said one spindle, a single continuous V-belt trained around said pulleys and having but a single arc of contact with each pulley, respectively, said V-belt having tapered driving surfaces in contact with said grooves of said drive and driven pulleys and a flat backside in contact with said clutch idler pulley, said belt being free of severe twists and crossovers in its installed condition on said pulleys and sequentially engaging said pulley on said one spindle and said clutch idler pulley.

2. A transmission as claimed in claim 1 wherein said clutch idler pulley is disposed within said triangular pattern whereby said arc of contact of said belt with said pulley on said one spindle exceeds 120 degrees when said clutch lever is in its drive establishing position.

3. A transmission as claimed in claim 1 wherein all of said arcs of contact are at least 120 degrees.

4. A transmission as claimed in claim 3 wherein said arc of contact of said belt on said drive pulley is at least 150 degrees.

5. In a power transmission for a mower having a downwardly open housing with a generally horizontal deck, the combination comprising:

three vertical spindles rotatably supported on said deck in a triangular pattern with upper ends disposed above said deck and lower ends disposed below said deck, one of said spindles being disposed forward of the other two spindles and said other two spindles being disposed on laterally opposite sides of said one spindle, a cutting blade secured to said lower end of each of said spindles for rotation therewith, a driven pulley secured to said upper end of each of said spindles for rotation therewith, a drive pulley disposed on a vertical axis spaced forwardly of said triangular pattern and said one spindle, grooves in each of said driven and drive pulleys adapted to receive a V-belt, a clutch idler lever pivotally mounted on said housing for movement about a generally upright axis between a drive establishing position in which said belt is tightened and a nondriving position in which said belt is relaxed, said lever having a radially extending arm, a clutch idler pulley rotatably supported on said arm for rotation about an axis spaced from said upright axis and from the axes of rotation of said spindles, a belt idler pulley mounted on said housing, a single continuous V-belt trained around said pulleys and having but a single arc of contact with each pulley, respectively, said V-belt having tapered driving surfaces in contact with said grooves of said drive and driven pulleys and a flat backside in contact with said clutch idler pulley and said belt idler pulley, said belt being free of severe twists and crossovers in its installed condition on said pulleys and sequentially engaging said pulley on said one spindle, said clutch idler pulley, said belt idler pulley and said drive pulley.

6. A transmission as claimed in claim 5 wherein said belt idler pulley slopes upwardly from rear to front at an angle less than 15 degrees.

7. In a power transmission for a mower having a downwardly open housing with a generally horizontal deck, the combination comprising:

three vertical spindles rotatably supported on said deck in a triangular pattern with upper ends disposed above said deck and lower ends disposed below said deck, one of the spindles being disposed forward of the other two spindles and said other two spindles being disposed on laterally opposite sides of said one spindle, a cutting blade secured to said lower end of each of said spindles for rotation therewith, a driven pulley secured to said upper end of each of said spindles for rotation therewith, a drive pulley disposed on a vertical axis spaced forwardly of said triangular pattern and said one spindle, grooves in each of said driven and drive pulleys adapted to receive a V-belt, a clutch idler lever pivotally mounted on said housing for movement about a generally upright axis between a drive establishing position in which said belt is tightened and a nondriving position in which said belt is relaxed, said lever having a radially extending arm, a clutch idler pulley rotatably supported on said arm for rotation about an axis spaced from said upright axis and from the axes of rotation of said spindles, a fixed axis idler pulley rotatably mounted on said housing, a single continuous V-belt trained around said pulleys and having but a single arc of contact with each pulley, respectively, said V-belt having tapered driving surfaces in contact with said grooves of said drive and driven pulleys and a flat backside in contact with said clutch and fixed axis idler pulleys, said belt being free of severe twists and crossovers in its installed condition on said pulleys and sequentially engaging said pulley on said one spindle, said clutch idler pulley, said fixed axis idler pulley and said drive pulley.

8. A transmission as claimed in claim 7 wherein said fixed axis idler pulley slopes upwardly from rear to front at an angle less than 15 degrees.

9. In a mower movable in a predetermined forward direction during a mowing operation having a downwardly open housing with a generally horizontal deck, the combination comprising:

three vertical spindles rotatably supported on said deck in a triangular pattern with upper ends disposed above said deck and lower ends disposed below said deck, one of said spindles being disposed forward of the other two spindles and said other two spindles being disposed on laterally opposite sides of said one spindle, a cutting blade secured to said lower end of each of said spindles for rotation therewith, a driven pulley secured to said upper end of each of said spindles for rotation therewith, a drive pulley disposed on a vertical axis spaced forwardly of said triangular pattern and said one spindle, grooves in each of said driven and drive pulleys adapted to receive a V-belt, an idler pulley on said housing rearwardly of said one spindle, said idler pulley sloping upwardly from rear to front at an angle less than 15 degrees, a single continuous V-belt trained around said pulleys and having but a single arc of contact with each pulley, respectively, said V-belt having tapered driving surfaces in contact with said grooves of said drive and driven pulleys and a flat backside in contact with said idler pulley, said belt being free of severe twists and crossovers in its installed condition on said pulleys, said belt sloping upwardly from said idler pulley to said drive pulley at a slope corresponding substantially with said slope of said idler pulley.

10. The combination of claim 9 wherein said idler pulley is rotatably mounted on said housing on a fixed axis.

* * * * *